United States Patent [19]

Kikuchi et al.

[11] 4,320,493
[45] Mar. 16, 1982

[54] LINEAR TRACKING ARM ASSEMBLY WITH ELECTRIC BRAKE

[75] Inventors: Takashi Kikuchi; Tsuneo Ishii, both of Tokorozawa, Japan

[73] Assignee: Pioneer Electronic Corporation, Tokyo, Japan

[21] Appl. No.: 142,144

[22] Filed: Apr. 14, 1980

[30] Foreign Application Priority Data

Apr. 18, 1979 [JP] Japan .................................. 54-47412

[51] Int. Cl.³ ............................................. G11B 3/38
[52] U.S. Cl. .................................... 369/220; 378/648; 378/687
[58] Field of Search ................. 369/219, 220; 318/640, 318/687, 648

[56] References Cited

U.S. PATENT DOCUMENTS

| | | | |
|---|---|---|---|
| 4,170,783 | 10/1979 | Tajima | 369/219 X |
| 4,199,149 | 4/1980 | Ohsawa | 369/220 |
| 4,253,126 | 2/1981 | Kuribayashi et al. | 369/219 |
| 4,260,162 | 4/1981 | Morii et al. | 369/219 X |

FOREIGN PATENT DOCUMENTS 55-42359  3/1980  Japan ................................ 369/220

*Primary Examiner*—Charles E. Phillips
*Attorney, Agent, or Firm*—Michael J. Striker

[57] ABSTRACT

A linear tracking arm assembly for linearly tracking a recording medium in response to manual or automatic lead-in and return indications, which includes a linearly movable conveyer means carrying thereon a pick-up arm. The linearly movable conveyer means is driven by an electro-magnetic linear motor. An electric brake means is provided on the conveyer means, for applying a suitable brake to the electro-magnetic linear motor in accordance with a speed of the conveyer means.

5 Claims, 5 Drawing Figures

4,320,493

LINEAR TRACKING ARM ASSEMBLY WITH ELECTRIC BRAKE

FIELD OF THE INVENTION

The present invention relates to a tracking arm assembly for use with an audio disc player, a video disc player, or the like and, more particularly, to a linear tracking arm assembly in which a pick-up arm linearly moves to trace a track formed on a recording medium such as an audio or video disc placed on a turn-table or the like.

BACKGROUND OF THE INVENTION

A linear tracking arm assembly comprises a pick-up arm for detecting information recorded on a recording medium mounted on drive means such as a turn table, and a conveyor mechanism for linearly conveying the pick-up arm along the recording medium, so that the pick-up arm can linearly track the recording medium. The conveyor mechanism includes a conveyor for carrying thereon the pick-up arm and linearly movable with respect to the recording medium, and drive means for making the conveyor to move so as to perform lead-in, play and return operations of the pick-up arm.

A sophisticated linear tracking arm assembly has been proposed in a co-pending U.S. patent application No. 964,781, now U.S. Pat. No. 4,253,126 in which the drive means includes an electro-magnetic linear motor for driving the conveyor.

A primary object of the present invention is to provide an improved linear tracking arm assembly which comprises a similar type of drive means to the assembly disclosed in the above-mentioned U.S. patent application and which is reliable and smooth in operation.

Another object of the present invention is to provide an improved linear tracking arm assembly which can avoid unwanted overshoot or overrunning at the stoppage of the conveyor.

Other objects and advantages of the present invention will become apparent to those skilled in the art from a consideration of the following detailed description of illustrative embodiment of the invention, had in conjunction with the accompanying drawings in which like numerals refer to like or corresponding parts.

DESCRIPTION OF THE PREFERRED EMBODIMENTS

Figure 1:
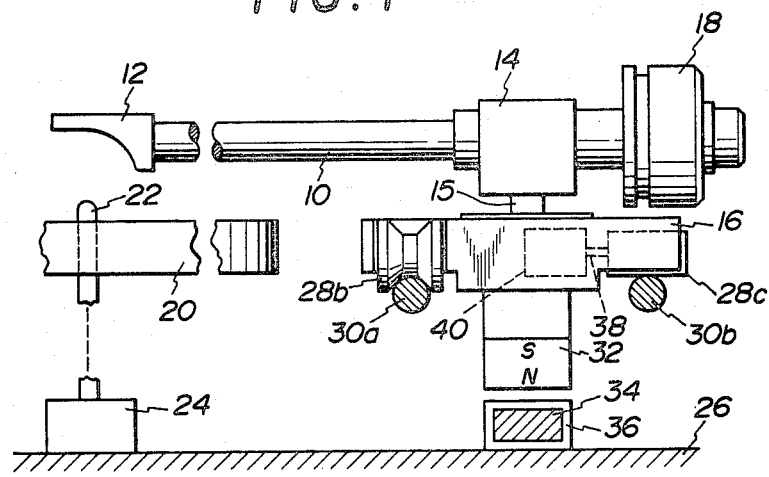
FIG. 1 is a cross sectional view of a linear tracking arm assembly according to the present invention.
Figure 2:
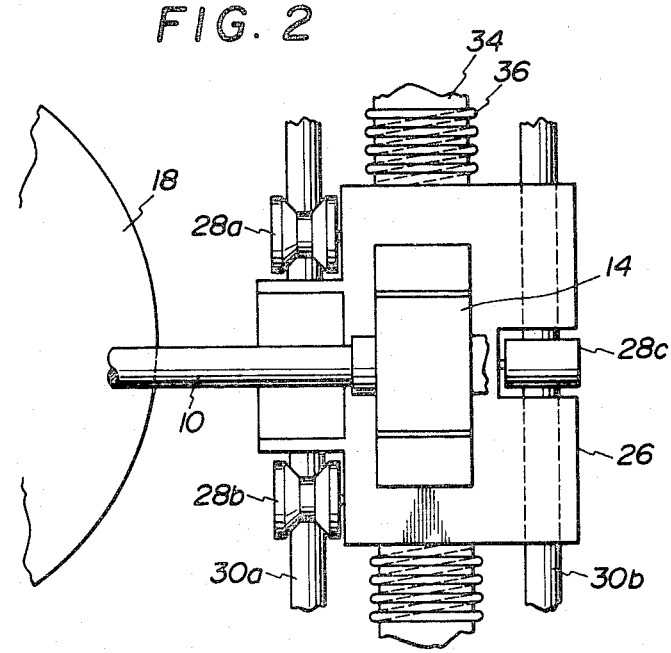
FIG. 2 is a plan view of the linear tracking arm assembly shown in FIG. 1.

Referring now to the drawings and more specifically to FIGS. 1 and 2, there is shown a linear tracking arm assembly according to the present invention, which comprises a pick-up arm 10 having its one end a cartridge shell 12. The pick-up arm 10 is vertically swingably mounted at its intermediate portion on an arm holder 14. The arm holder 14 is mounted on an arm shaft 15 which is in turn horizontally swingably mounted on the support body 16. The pick-up arm 10 is provided at its other end with a counter weight 18 the position of which is manually regulated so as to provide a suitable weight balance. In the case of audio disc player, a cartridge (not shown) to be mounted on the cartridge shell 12 contains a stylus chip to contact with the recording surface of a record disc mounted on a turn table 20 which is in turn driven to rotate through a spindle 22 by a motor 24 fastened on a base or frame 26. The support body 16 is provided with preferably three rollers 18a, 28b and 28c on the side portions thereof. The rollers 28a and 28b are rollable on a guide rail 30e and the roller 28c is rollable on another guide rail 30b. The guide rails 30a and 30b are spaced from and coextensive in parallel with each other and are fastened on the base 24 by means of a suitable mechanism (not shown). The rollers 28a, 28b respectively have on the peripheral surfaces thereof circumferentially extending U-shaped or V-shaped grooves into which the guide rails 30a couples so that the support body 16 is guided by guide rail 30a in one direction parallel to the longitudinal direction of the guide rails 30a an 30b.

On the other hand, the roller 28c has a flat peripheral surface which abuts onto the guide rail 30b. On the lower surface of the support body 16 is mounted a permanent magnet 32 which confronts a magneticrod 34 so fastened on the base 26 as to extend in parallel with the guide rails 30a and 30b. A coil 36 is wound on the magnetic rod 34. The roller 28c is mounted on a rotary shaft 38 of a dc generator 40 mounted on the support body 16, so that the rotation of the roller 28c causes the dc generator 40 to produce a dc voltage at the output terminals thereof. The magnitude of the dc voltage is proportional to the rotational speed of the roller 28c, that is, the speed of the support body 16. A magnetic flux produced from a magnetic pole of the permanent magnet 32 reaches the magnetic rod 34 through the coil 36 so that the magnet 32 and the coil 36 constitute an electric lienear motor, whereby the support body 16 is driven to move along the guide rails 30a and 30b while the rollers 28a, 28b and 28c are rollable on the guide rails 30a and 30b, respectively.

Figure 3:
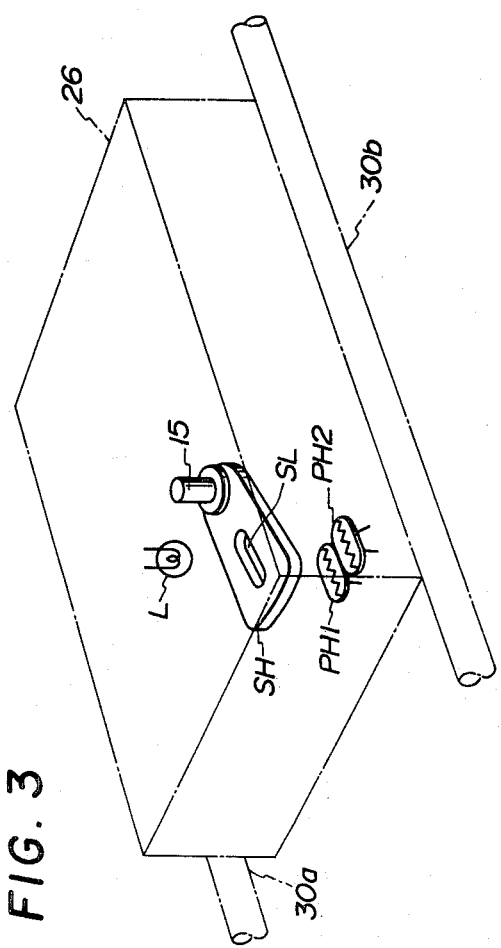
FIG. 3 is a perspective view sketchly showing a deviation detecting assembly mounted on a portion of the assembly shown in FIG. 1.

FIG. 3 sketchly shows a deviation detecting assembly mounted on the support body 16, for detecting deviation of the angular position of the pick-up arm 10 with respect to the support body 16. The deviation detecting assembly includes a shutter SH fixedly connected with the arm shaft 15. The shutter SH has an elongated slot SL through which a lamp L and a pair of photo-sensors PH1 and PH2 face each other. The lamp L may be replaced by a light emissive diode, if preferred. The light rays emitted from the lamp L are modulted in intensity by the shutter SH so that the resistivities of the photosensors PH1 and PH2 vary in accordance with deviation in the angular position of the pick-up arm 10 with respect to the support body 16.

Figure 4:
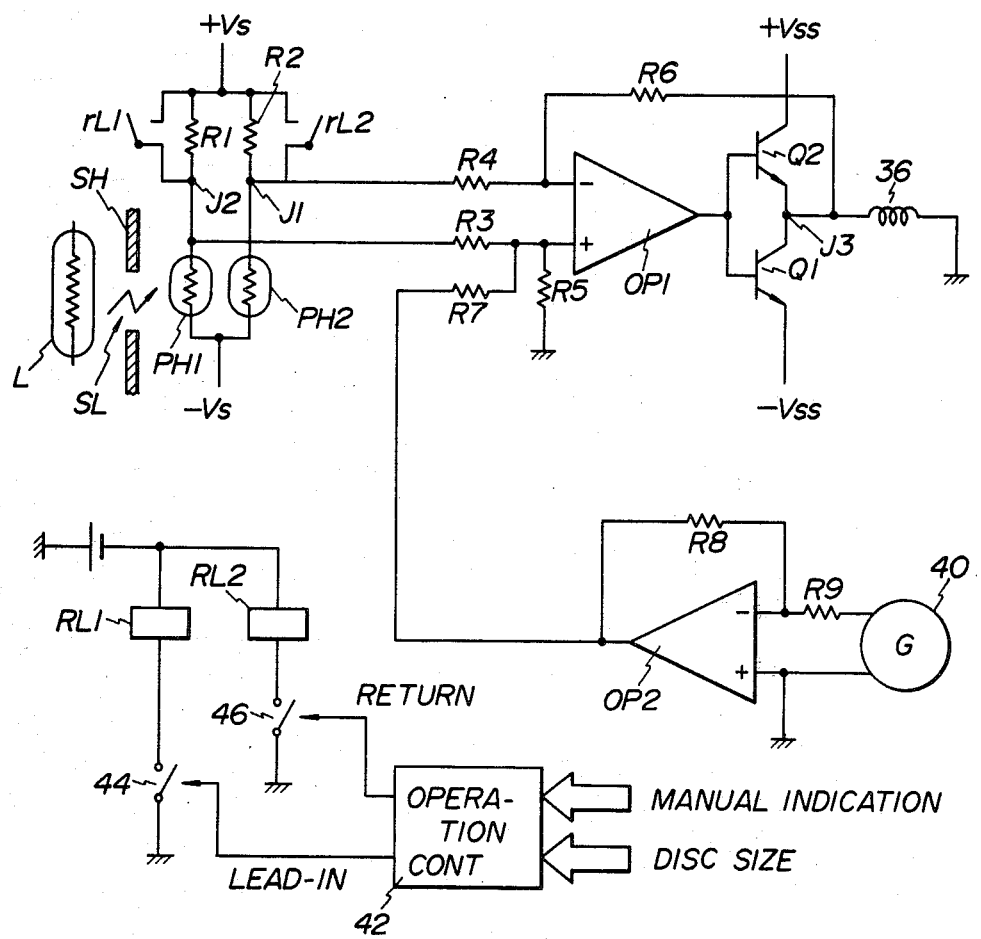
FIG. 4 is a circuit diagram showing a servo control circuit for controlling the linear tracking arm assembly shown in FIGS. 1 and 2.

FIG. 4 shows a servo control circuit for controlling the linear tracking arm assembly so as to perform lead-in, play and return operations in accordance with manual start, stop and repeat indications by the operator. The manual indications are applied to an operation controller 42 which, on the other hand, receives disc size information from a suitable means (not shown). The operation controller 42 produces on its one output terminal a lead-in indication signal when the manual start indication is applied thereto. The lead-in signal lasts until the pick-up arm 10 reaches the peripheral edge of a disc mounted on the turn-table. The operation controller 42 produces its other output terminal a return indication signal either when the arm 10 reaches the end of the disc or when the manual stop indication is applid to the controller 42. The return indication signal lasts until the pick-up arm 10 returns to the rest position. The lead-in and return indication signals are respectively applied to gate switches 44 and 46 which then operate to close its circuits. When the relay coil RL1 is energized, a relay switch rl1 is actuated to close its circuit. When the relay coil RL2 is energized, a relay switch rl2 is actuated to close its circuit. The relay switches rl1 and rl2 are connected in parallel with resistors R1 and R2 having the terminals thereof connected with a positive voltage source $+V_s$ and the other terminals thereof respectively connected through the photo-sensors PH1 and PH2 to a negative voltage source $-V_s$ thereby forming a bridge circuit.

A joint J1 between the resistor R1 and the photosensor PH1 is connected through a resistor R3 to a positive input terminal of an operational amplifier OP1. A joint J2 between the resistor R2 and the photo-sensor PH2 is connected through a resistor R4 to a negative input terminal of the operational amplifier OP1. The positive input terminal of the operational amplifier OP1 is grounded through a resistor R5. An output terminal of the operational amplifier OP1 is connected to bases of transistors Q1 and Q2 which constitute a push-pull amplifier. The push-pull amplifier is supplied with positive and negative voltages $+V_{ss}$ and $-V_{ss}$. The emittersof the transistors Q1 and Q2 are connected with each other at a joint J3 which is an output point of the push-pull amplifier and is connected to one terminal of the coil 36 of the electric linear motor. The coil 36 is in turn grounded. The output point J3 is connected through a feed-back resistor R6 to the negative input terminal of the operational ampmlifier OP1. The positive input terminal of the operational amplifier OP1 is further connected through a resistor R7 to an output terminal of an operational amplifier OP2. A positive input terminal of the operational amplifier OP2 is grounded and is further connected to one output terminal of the electric generator 40 mounted on the support body n16. A negative input terminal of the operational amplifier OP2 is connected through a feed-back resistor R8 to the output terminal thereof and is further connected through a resistor R9 to the otuer output terminal of the generator 40. The generator 40 prduces across tis output terminal a dc voltage proportional to the rotational speed of the rotary shaft thereof which is conntected to the roller 28c. Thus, a dc voltage varying in accordance with the speed of the pick-up arm 10 is supplied through a resistor R7 to the positive input terminal of the operational amplifer OP1.

When, in operation, manual start indication is applied to the operation control circuit 42, the relay switch rl1 is first closed so that as voltage $V_1$ appears across the joints J1 and J2 which is in turn supplied to the input terminals of the operational amplifier OP1. An output voltage of the operational amplifier OP1 is amplified by the push-pull amplifier of transistors Q1 and Q2 and then supplied to the coil 36 whereby the support body 16 moves toward the turn table 18 from the rest position together with the arm 10 so as to perform the lead-in operation. The voltage $V_1$ is concurrently modified in intensity by a voltage from the operational amplifier OP2 which is proportinal to the speed of the support body 16 so that the support body 16 is suitably braked and prohibittedunwanted overrunning. When the cartridge shell 12 reaches just above the peripheral edge portion of a disc on the turn table 18, the operation controller 42 ceases energization of the relay coil RL1 so that the relay switch R1₁ become open whereby the coil 36 is de-energized. Then, the pick-up arm 10 lowers toward the turn table until the pick-up detector engages with the recording surface of the recording medium on the turn table 18 thereby to start the play operation. When, during the play operation, the pickup arm 10 deviates by an angle $\theta_i$ from its home angular position perpendicular to the advancing direction of the support body 16, due to the advance of a pick-up (not shown) mounted on the end of the arm 10 with respect to the recording medium, then a voltage proportional to the angle $\theta_i$ appears across the joints J1 and J2 which is amplified by the operational amplifier OP1 and the push-pull amplifier and then supplied to the coil 36, whereby the support body is moved so as to reduce the angle $\theta_i$ to an angle $\theta_o$. In such a manner as mentioned above, the pick-up arm 10 and the suport body 16 advance together toward the spindle 20. When the operation controller 42 either detects the end of the play or reproduction of the recorded information or receives the manual stop indication, then the controller 42 energizes the relay coil RL2 so that the rl2 is closed thereby causing the coil 36 is reversely energized to return the support body 16 and the arm 10 to the rest position.

Figure 5:
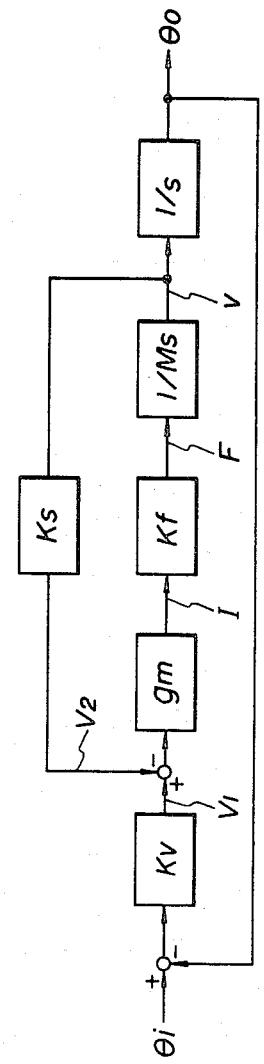
FIG. 5 is a block diagram showing a feed-back system equivalent to the overall system of the linear tracking arm assembly shown in FIGS. 1 through 4.

FIG. 4 shows a feed-back circuit representative of the linear motor and the servo control circuit of FIG. 4. Referring to FIG. 5, the servo control system in the linear tracking arm assembly of the present invention will be explained in more detail hereinbelow.

When the pick-up arm 10 deviates from the home position by an angle $\theta_i$, then the deviation detecting assembly converts the angular deviation into a voltage $V_1$ through a conversion coefficient $K_v$. The voltage $V_1$ is converted into a current I though a conversion coefficient gm by means of the operational amplifier OP1 and the push-pull amplifier of the transistors Q1 and Q2. The current I is converted into a force F through a conversion coefficient $K_f$ by means of the linear motor. The force F is converted into a speed v of the support body 16 through a coefficient 1/Ms, where M represents a mass of the overall moving parts moving together with the support body 16 and s represents the laplacian. The speed v of the support body 16 results in the resultant angle $\theta_o$ of the pick-up arm 10 with respect to the support body 16. The velocity v of the support body 16 is converted into a voltage $V_2$ through a conversion coefficieng $K_s$ by means of the generator 40 and the voltage $V_2$ is in the reverse polarity added to the voltage $V_1$.

The loop gain $\theta_i/\theta_o$ of the above-mentioned feed back control system will be expressee by:

$$\frac{\theta_o}{\theta_i} = \frac{\dfrac{K_v \cdot gm \cdot K_f}{M}}{s^2 + \dfrac{K_s}{M} s + \dfrac{K_v \cdot gm \cdot K_f}{M}} \tag{1}$$

If, now, $$\omega n = \sqrt{\frac{K_v \cdot gm \cdot K_f}{M}}, \xi = \frac{K_s}{2}\sqrt{\frac{1}{M \cdot K_v \cdot gm \cdot K_f}}$$

Then, the above equation (1) will be rewritten as follows:

$$\frac{\theta_o}{\theta_i} = \frac{\omega n^2}{s^2 + 2\xi\omega ns + n^2} \qquad (2)$$

As is well known in the art, such a feed back control system as expressed by the equation (2) is of the second-order type and $\xi$ represents a damping ratio. The loop gain expressed by $\theta_o/\theta_i$ takes various values in accordance with variation of the damping ratio $\xi$. Usually, the value of the damping ratio is preferably close to a critical damping level, that is, in a range from $1\sqrt{2}$ to 1. The above-mentioned coefficients or factors M, $K_v$, gm, $K_f$, are determined by the overall arrangement including the deviation detector, the control circuit, the linear motor assembly, the conveyor means, and the pick-up arm 22. However, the conversion coefficient Ks can be suitably determined by selecting the characteristics of the generator 40 so that the damping ration $\xi$ resides in tbhe above-mentioned range.

It is now apparent from the above description that the support body 26 can smoothly and precisely advance without unwanted overshoot or overrunning because of the braking effect by means of the generator 40 and the sevo control circuit of FIG. 4.

It will be understood that the invention is not to be limited to the exact construction shown and described and that various changes and modifications may be made without departing from the spirit and scope of the invention, as defined in the appended claims.

What is claimed is:

1. A linear tracking arm assembly for linearly tracking a recording medium carrying thereon audio or video information in response to lead-in and return indication signals, which assembly comprises;

recording medium drive means for driving said recording medium in a predetermined manner;

support and guide means fixedly positioned in conjunction with said recording medium, said support and guide means comprising a pair of guide rails spaced apart from and coextensive with each other and extending in a predetermined direction with respect to said recording medium drive means;

conveyer means to engaged with said support and guide means as to be linearly movable substantially in parallel with said predetermined direction, said conveyer means including a support body and at least three rollers rotatably mounted on said support body, at least one of said rollers being rollable on one of said guide rails and the remaining rollers being rollable on the other guide rail so that said support body is movable along said guide rails;

a pick-up arm movable with said support body;

electro-magnetic drive means connected to said conveyer means, for moving said conveyer means linearly along guide rails in response to a drive signal;

a speed sensor mounted on said conveyer means, for producing a speed signal according to the detected speed; and control means connected to said electro-magnetic drive means, for producing said drive signal in accordance with said lead-in and return indication signal and a deviation signal;

a deviation detector mounted on said conveyer and connected to said control means, for producing said deviation signal in accordance with deviation of said pick-up arm with respect to said support body; and electric brake means connected to said speed sensor and said control means, for modifying said drive signal in response to said speed signal so as to apply a brake to said conveyer means.

2. A linear tracking arm assembly according to the claim 1, in which said speed sensor includes:

a dc generator having the rotary shaft thereof connected to one of said rollers so as to produce across the output terminal thereof a dc voltage proportional to the rotational speed of said one of the rollers.

3. A linear tracking arm assembly according to the claim 1, in which said electric brake means includes:

a superposer for superposing said dc voltage to said deviation signal.

4. A linear tracking arm assembly according to the claim 1, in which said deviation detector includes:

a shutter connected to said pick-up arm and having a slot;

a light source mounted on said support body;

photo detecting means for detecting the light rays emitted through said slot from said light source and for producing said deviation signal having a voltage proportional to the intensity of the detected light rays.

5. A linear tracking arm assembly according to the claim 4, in which said photo detecting means includes:

a pair of photo-sensors mounted on said support body for receiving the light rays through said slot, the respective resistivities of said photo-sensors being varied in accordance with the movement of said shutter; and voltage supplying means connected to said photosensors, for supplying across said photosensors with a predetermined voltage, so that voltages appear across said photosensors.

* * * * *